Jan. 25, 1966     J. L. LAUER     3,231,482

PROCESS FOR PREPARING CARBON DISULFIDE

Filed June 7, 1963     2 Sheets-Sheet 1

INVENTOR.
JAMES L. LAUER

BY Robert O. Spindle

ATTORNEY

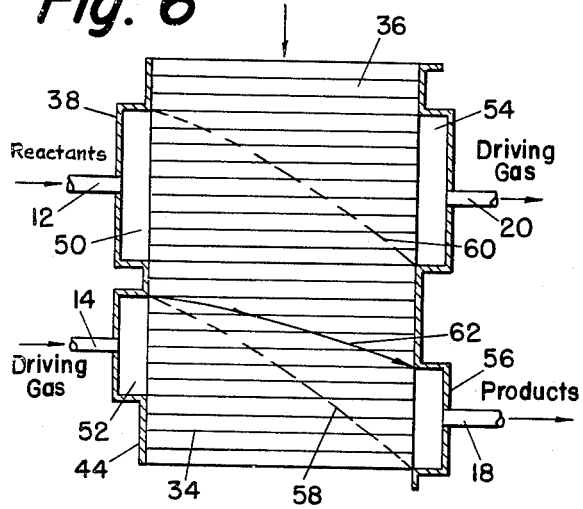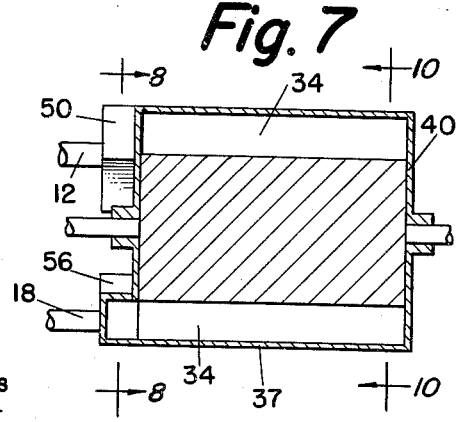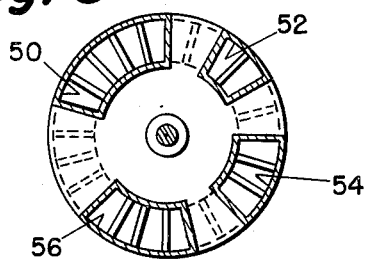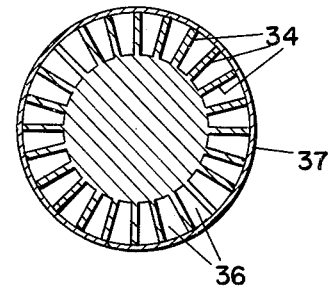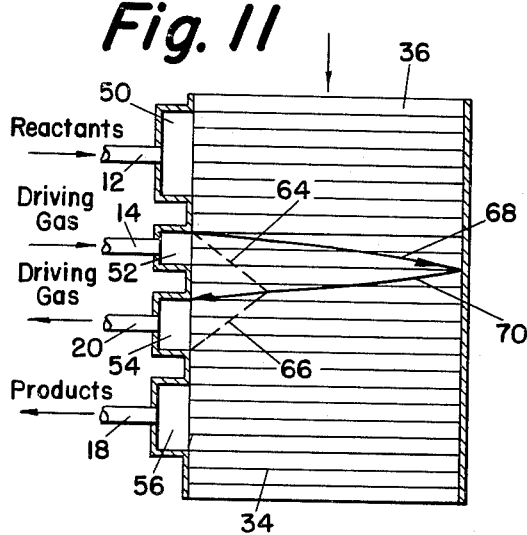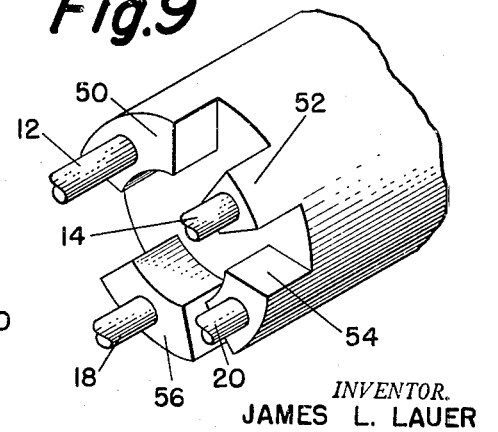

United States Patent Office 3,231,482
Patented Jan. 25, 1966

3,231,482
PROCESS FOR PREPARING CARBON DISULFIDE
James L. Lauer, Philadelphia, Pa., assignor to Sun Oil Company, Philadelphia, Pa., a corporation of New Jersey
Filed June 7, 1963, Ser. No. 287,174
13 Claims. (Cl. 204—154)

This application is a continuation-in-part of application Serial No. 846,585, filed October 15, 1959, now abandoned.

It is known to prepare carbon disulfide by reaction of a carbon compound with a sulfur containing material at an elevated temperature in the presence or absence of a catalyst for the reaction. This reaction is endothermic, and a difficulty with prior processes has been the supplying of the heat necessary to bring about the reaction. In some processes this has been accomplished by introducing oxygen into the reaction zone to cause combustion of a portion of the carbon compound in order to provide heat. This procedure has disadvantages, including the conversion of carbon to carbon oxides rather than to the desired carbonaceous products.

The present invention provides a highly satisfactory reaction of carbonaceous, hydrogenous and sulfur containing material to form carbon disulfide without the necessity for the use of oxygen in the reaction. This is accomplished according to the invention by subjecting the reactants to one or more mechanical shock waves, thereby to produce a high temperature and pressure in the reactant material for a very short period of time. Highly satisfactory yields of carbon disulfide are obtained in such operation, and the short residence time contributes to avoiding the formation of undesired reaction products. The use of the mechanical shock wave to produce the necessary heat of reaction makes it possible to avoid the use of combustion of a portion of the carbon compound to provide the heat. Sulfur, ethylene, acetylene and hydrogen are obtained as valuable additional products of the reaction.

Oxygen is excluded from the reaction zone in order to avoid decomposition of carbon disulfide formed in the reaction. The reactant gases are free of oxygen and of oxygen-containing compounds which decompose to form oxygen under the reaction conditions. Any preheating of reactant gases is done by indirect heat transfer or by direct heat transfer from an oxygen-free material, rather than by combustion of a portion of the reactant gases. The driving gas and scavenging gas as subsequently described are also preferably free of oxygen and of oxygen-containing compounds which decompose to form oxygen under the reaction conditions.

Figure 1:
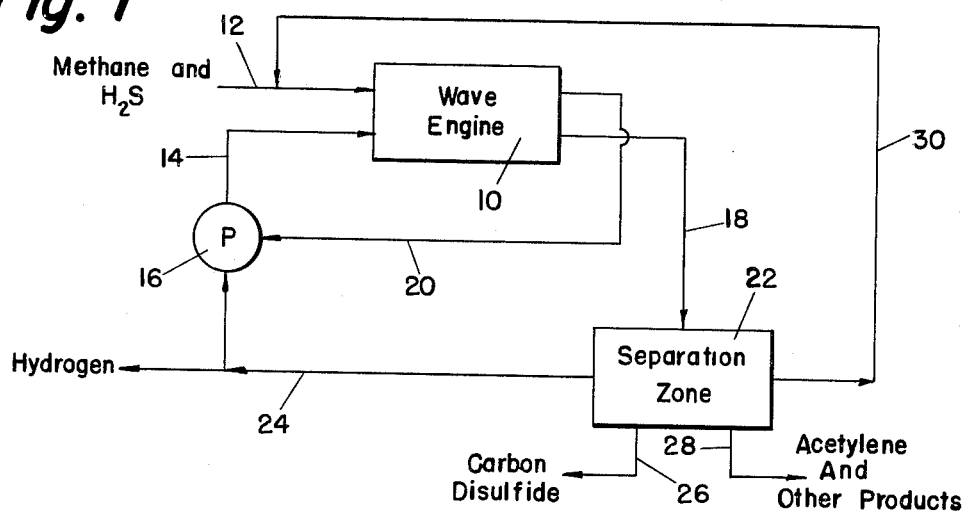
Figure 2:
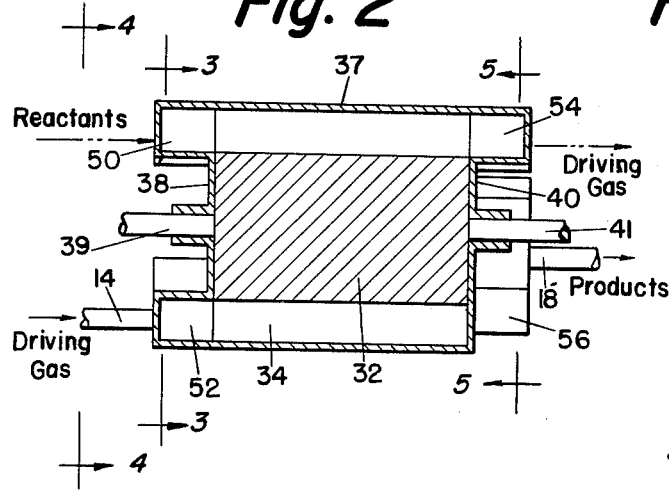
Figure 3:
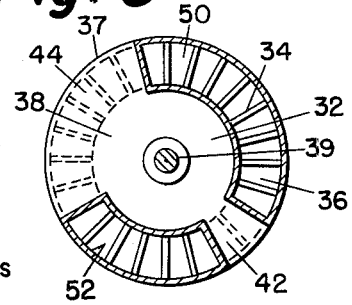
Figure 5:
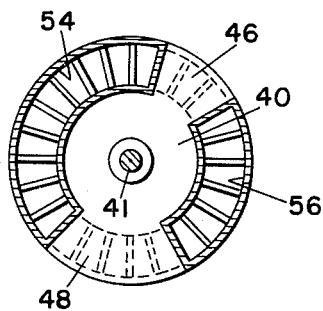
Figure 4:
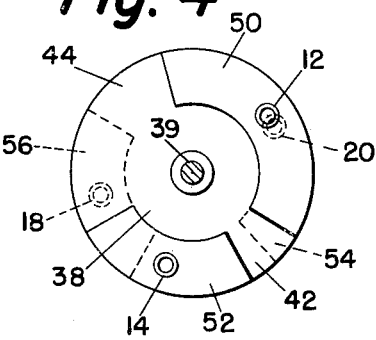

The invention will be further described with reference to the attached drawings wherein FIGURE 1 is a schematic flow diagram of a process system for the preparation of carbon disulfide from methane and hydrogen sulfide, the system including a wave engine for producing the mechanical shock wave. FIGURE 2 is a sectional elevation of the wave engine, FIGURE 3 is a sectional left-hand end view on the line 3—3 of FIGURE 2, FIGURE 4 is a left-hand view of FIGURE 2, FIGURE 5 is a sectional right-hand view on the line 5—5 of FIGURE 2, FIGURE 6 is a development of the cylindrical wave engine of FIGURE 2 and illustrates the paths of gas flow through the wave engine, and FIGURES 7 to 11 are views of a second embodiment of the wave engine, the views corresponding to those of FIGURES 2 to 6, respectively, except that FIGURE 9 is an isometric drawing, whereas the corresponding FIGURE 4 is not.

Referring to FIGURE 1, methane and hydrogen sulfide are introduced through line 12 into wave engine 10. Hydrogen at elevated pressure is introduced through line 14 into wave engine 10, and subjects the previously introduced methane and hydrogen sulfide to a shock wave in a manner which is subsequently described more fully. The methane and hydrogen sulfide are thereby heated to reaction temperature and react to form carbon disulfide and sulfur with acetylene and ethylene as by-products. The reaction products, together with unreacted methane and hydrogen sulfide, are removed from the wave engine through the line 18. Hydrogen is removed separately from the wave engine through the line 20.

The reaction products and unreacted material are introduced into a separation zone 22 wherein a plurality of operations are carried out to obtain the respective constituents in purified form. Hydrogen, which was formed in the reaction between methane and hydrogen sulfide, is separated by known means such as diffusion through a palladium tube and is removed through line 24. A portion of this hydrogen is introduced into compressor 16 for subsequent use in another cycle of the wave engine operation. The remainder of the product hydrogen is withdrawn as a product of the process.

Carbon disulfide is separated from the remaining product gases by scrubbing with an alkaline medium or by other known separation procedure. Acetylene is subsequently separated from the remaining gases by absorption in a copper salt solution or by other known means for recovering acetylene from gaseous mixtures. The remaining methane and hydrogen sulfide are recycled to the wave engine through line 30.

Sulfur is separated from the gaseous mixture by condensation on a cold surface or by steam or by a combination of condensation and steam distillation or by other well-known methods. The sulfur dissolved in the carbon disulfide is separated by distillation of the carbon disulfide. Ethylene is separated from the remaining gases by cooling. All gases may, of course, be separated by diffusion or other standard procedures.

In the operation illustrated in FIGURE 1, the hydrogen acts as a driving gas to cause a shock wave in the reactant material. This hydrogen is substantially unchanged as a result of passage through the wave engine, and is recycled through line 20 and the compressor 16. If the hydrogen withdrawn through line 20 contains substantial quantities of other gases in the system, it can be passed through the separating system 22 prior to recycle to the wave engine 10, though this is usually not necessary.

Referring to FIGS. 2 to 6, the wave engine 10 is illustrated therein in more detail. The wave engine comprises a cylindrical rotor 32 to which are attached a plurality of longitudinal vanes 34. These vanes provide a series of channels or tubes 36 having open ends. The tubes are bounded inwardly by the rotor 32, outwardly by the stationary cylindrical shell 37 of the wave engine, and laterally by the vanes 34. The rotor and attached vanes are rotated by means of a motor not shown, and a shaft 39. The shaft 41 is seated in a bearing not shown.

The wave engine is closed at the ends by stationary end plates 38 and 40. Positioned outwardly from the end plates and adjacent to the ends of the tubes 36 are two stationary manifolds at each end of the wave engine. The manifolds 50 and 52 are positioned at the left-hand end, and the manifolds 54 and 56 at the right-hand end. Between manifolds 50 and 52, the wave engine is closed at the ends by extensions 42 and 44 of end plate 38, and between manifolds 54 and 56, by extensions 46 and 48 of end plate 40.

The operation of the wave engine can best be understood with reference to FIG. 6. The clockwise rotation of the rotor results in a motion of the tubes which in FIG. 6 is from top to bottom. The reactants are continuously introduced, for example at one atmosphere and 420° C., through line 12 into manifold 50, from which they enter the left ends of those tubes 36 which are in communication with the manifold 50. The reactants fill those parts of the tubes on the left side of the interface 60, which is indicated in FIG. 6 by a dashed line. On the left side of the interface are reactants, and on the right side hydrogen.

The driving gas, hydrogen, is continuously introduced, e.g., at 12 atmospheres and 420° C. through line 14 into the manifold 52, from which it is introduced into the left ends of the tubes which are in communication with that manifold. The hydrogen fills those parts of the tubes on the left side of the interface 58, the reactants now being on the right side of the interface 58. The reactants are subjected to a shock wave as a result of the sudden force of the high pressure driving gas entering the tubes. This shock wave, traveling at a velocity of about Mach 5, moves along a path indicated by the line 62 in FIG. 6. The shock wave travels faster than the interface between the driving gas and the reactants, the velocity of the interface 58 and of the interface 60 being about Mach 1. The shock wave therefore passes ahead of the interface 58 and travels through the reactant mixture. The latter is thereby shock-compressed to a pressure of about 8 atmospheres with resulting sudden rise in temperature to about 990° C. At this temperature conversion of reactants to products takes place. The products are expanded into manifold 56 and line 18, thereby rapidly cooling the reaction products and quenching the reaction. This rapid cooling provides a large increase in the yield of desired reaction products. The driving gas is withdrawn through manifold 54 and line 20.

The tubes are moving in a circular path, and therefore when a tube reaches the lower end of FIG. 6, it has returned to its original position, i.e. to the upper end of FIG. 6, and then begins a new cycle identical with the one previously described.

After the driving gas has been expanded from the tubes into the driving gas outlet manifold, the contents of the tubes are at a temperature of the same order of magnitude as that which prevailed prior to the creation of the shock wave. A gas to act as a scavenging or cooling agent can be then introduced into the tubes if it is desired either to further cool the contents of the tube or to remove residual driving gas from the tube or both.

The scavenging or cooling gas can be any gas which is nonreactive at the prevailing conditions. It may be constituent or constituents of the reactant materials or reaction products, since such constituents are generally non-reactive at the conditions prevailing after removal of the driving gas. Nitrogen is a preferred scavenging or cooling gas, but others such as hydrogen, methane, etc., can be employed.

If scavenging or cooling gas is used, such gas may be introduced into the tubes through an inlet manifold, not shown in FIGS. 2 to 6, located below inlet manifold 52 as shown in FIG. 6. The additional inlet manifold would therefore be positioned so that the left ends of the tubes come in communication with the additional manifold after coming into communication with manifold 52 and before again coming into communication with manifold 50. A suitable outlet manifold, also not shown, would also be provided, to come into communication with the right ends of the tubes after the tubes have come in communication with manifold 54 and before again coming into communication with manifold 56.

Turning to FIGS. 7 to 11, operation is therein illustrated which involves the production of a reflected shock wave which results in the subjection of the reactants to two shock waves in rapid succession. Each shock wave produces a rapid heating of the reactants, and the use of reflected shock wave makes it possible to obtain higher temperatures than those which are obtained with a single shock wave such as that provided in the operation previously described.

In the apparatus shown in FIGS. 7 to 11, the outlets for the driving gas and reaction products are on the same side of the tubes as the inlets for the reactants and driving gas. The right ends of the tubes are closed by end plate 40 and gases therefore cannot be removed from the right side of the tubes.

Referring to FIG. 11, reactants are continuously introduced, for example at one atmosphere and 420° C., through line 12 and manifold 50 into the left ends of the tubes 36. At this time, the tubes contain a small amount of reaction products from a previous cycle, and the introduced reactants commingle with these products. Subsequently, the left ends of the tubes come in communication with manifold 52 through which driving gas is introduced, for example at 12 atmospheres and 420° C. The driving gas fills those parts of the tubes which are on the left side of the interface 64.

As a result of the introduction of the driving gas, a shock wave 68 travels through the reactants to the far ends of the tubes, and this shock wave compresses the reactants to a pressure of about 16 atmospheres, thereby heating the gases to 990° C. On reaching the end plate 40, the shock wave is reflected toward the left ends of the tubes as a reflected shock wave 70, which further compresses the reactants and heats them to about 1537° C. The wave 70 pushes the interface between reactants and driving gas toward the left ends of the tubes as the reflected interface 66.

Driving gas is withdrawn through manifold 54 and line 20, and reaction products are evacuated through manifold 56 and line 18, leaving a small amount of reaction products in the tubes for the next cycle, which begins with the introduction of fresh reactants through line 12 and manifold 50.

If desired, a cooling gas can be introduced into the tubes following the evacuation of the reaction products and before the introduction of fresh reactants. The principles involved in such introduction are generally similar to those described previously in connection with FIG. 6. The inlet and outlet manifolds for such introduction and removal of cooling gas are preferably located on the same side of the tubes as the other manifolds, though other arrangements can be used.

The use of a reflected shock wave, as illustrated in FIGS. 7 to 11, is preferred because of the higher temperatures which are thereby obtainable while still maintaining a very short residence time.

A reflected shock wave is produced in another embodiment in operation wherein driving gas is introduced simultaneously from opposite ends of a reaction tube containing reactant gas at lower pressure than the driving gas. Two shock waves travel inwardly through the reactant gas to the center of the tube, where they meet and are reflected from each other, to travel outwardly through the reactant gas again. The driving gas is then withdrawn through the tube; the reaction products are then withdrawn from the tube, which is then preferably scavenged prior to the introduction of additional reactant gas and the beginning of another cycle.

It is within the scope of the invention to provide any suitable number of shock waves during a single cycle. In one embodiment, more than two shocks can be provided. In this embodiment, instead of providing the manifold 20 as an outlet for the driving gas, the reflected shock wave 70 can be again reflected toward the right ends of the tubes as a third shock wave not shown, the driving gas and reactants being separately withdrawn from the right ends of the tubes through suitable means not shown. Alternatively, the shock wave can be reflected back again as a fourth wave, etc. However, from the standpoint of simplicity of design and other features, it is preferred to provide only two shocks in a cycle.

Two primary shocks may be applied to a reaction mixture by recycling the total effluent from the outlet or by passing the total effluent into a second wave engine.

In its general aspect, the invention involves introducing reactant gases into a tube, introducing driving gas into the tube containing the reactants, the latter introduction being from either end of the tube or from both ends simultaneously, in either event resulting in the subjection of the reactants to a shock wave, and then separately removing driving gas and reaction products from the tube in any suitable order. The reactants and the driving gas can be introduced at the same or opposite ends of the tubes, and the reaction products and effluent driving gas can be removed at the same or opposite ends of the tube. In the light of the present specification, a person skilled in the art can design a suitable apparatus for any desired arrangement. From the standpoint of practicability, the apparatus illustrated in the drawing is preferred, but other apparatus is within the scope of the invention.

Hydrogen is much preferred for use as the driving gas according to the invention, since its low density and high heat capacity ratio make it particularly suitable for this use. The heat capacity ratio is the ratio of the heat capacity at constant pressure to the heat capacity at constant volume. Gases having low density and high heat capacity ratio are very effective in creating a shock wave and thereby generating high pressure and temperature in the reactant gases.

Although hydrogen is the preferred driving gas, it is within the scope of the invention to employ any other suitable gas, for example a constituent or constituents of the reaction mixture, or some other constituent or constituents of the product mixture, or some inert gas, e.g. helium.

The following table shows the effects of certain variables in the reaction on the temperatures which are obtained in the reactant gases as the result of a shock wave or waves. The variables which are illustrated in the table include the temperatures of the driving gas and reactants prior to the creation of the shock wave, the nature of the driving gas, the ratio of the pressures of the driving gas and of the reactant gases as introduced into the tubes, and the number of shocks to which the reactant gases are subjected. In each run in the following table, the reactants constitute a mixture of methane and hydrogen sulfide in a ratio of 1:2. Temperatures are given in degrees Kelvin, and pressures in atmospheres.

In the process according to the invention, the reaction temperature which is attained as a result of the shock wave or waves is preferably in the range from 800 to 2000° C., and more preferably at least 1200° C. The residence time of reactants in the tubes is preferably in the range from 0.0001 to 1.00 second, and more preferably in the range from 0.01 to 0.1 second. With higher temperatures, it is generally desirable to use shorter residence times in order to avoid excessive decomposition of reactants.

The pressure obtained in the reactant gases as a result of the shock wave or waves is preferably in the range from 5 to 30 atmospheres and is usually in the range from 5 to 15 atmospheres. The temperature and pressure obtained as a result of the shock wave or waves are inherent effects of the initial temperature and pressure of the reactants and driving gas, and also of the respective natures of the reactants and the driving gas, and are therefore subject to considerable variation.

Prior to the first shock wave, the reactant gases are preferably at a temperature in the range from 125 to 425° C. and at a pressure in the range from 0.1 to 2.0 atmospheres. Usually it will be desirable to introduce the reactants at one atmosphere or lower pressure; lower pressures are advantageous in that they facilitate the provision of a high ratio of driving gas pressure to reactant gas pressure, and such ratios favor the obtaining of high temperatures as a result of the shock wave. Other initial temperatures and pressures can be employed if desired, although initial temperatures above 425° C. should be avoided in order not to obtain premature and excessive reaction prior to subjection to the shock wave.

The initial temperature of the driving gas as introduced into the tubes is preferably in the range from 125 to 425° C. The ratio of the initial driving gas pressure to the initial reactant pressure is preferably in the range from 5 to 50, and more preferably at least 10. Other temperatures and pressures can be employed in some instances, and it is even possible to employ a driving gas which is initially at room temperature and obtain significant heating as a result of the shock wave. However, in order to obtain a sufficiently high temperature for a practical process, it is generally necessary to preheat the driving gas and also the reactants.

In order to obtain a reaction temperature of 800° C. or higher, it is generally necessary to use hydrogen as driving gas, a pressure ratio (i.e. initial ratio of driving gas pressure to reactant pressure) of at least 5, an initial reactant temperature of at least 300° C., and a reflected shock wave. To obtain a reaction temperature of 1500° C. or higher, with hydrogen and a reflected shock wave, pressure ratio of at least 20 and initial reactant temperatures of at least 400° C. will usually be needed.

The residence times of gases in the tubes and the through-puts of reactants and driving gas are functions

*Wave engine conditions*

1—driving gas
4—reaction mixture (driven)
2—gas behind shock front
5—gas behind reflected shock front

| Conditions | | Pressure ratios | | Temperature ratios | | Peak temperatures (°K.) | |
|---|---|---|---|---|---|---|---|
| $T_1$ | $T_4$ | $P_{14}$ | $P_{21}$[a] | $T_{21}$ | $T_{52}$ | $T_2$[b] | $T_5$[c] |
| A. $H_2$ at 300° K. | $H_2S$ and $CH_4$ in 2/1 ratio at 300° K. | 0.154 | 4 | 1.50 | 1.26 | 450 | 566 |
|  |  | 0.056 | 8 | 2.07 | 1.44 | 630 | 905 |
|  |  | 0.033 | 11 | 2.48 | 1.53 | 745 | 1,140 |
| B. $H_2$ at 700° K. | $H_2S$ and $CH_4$ in 2/1 ratio at 700° K. | 0.200 | 4 | 1.37 | 1.15 | 950 | 1,100 |
|  |  | 0.086 | 8 | 1.81 | 1.44 | 1,260 | 1,810 |
|  |  | 0.051 | 12 | 2.22 | 1.56 | 1,542 | 2,400 |

[a] $P_{21}$ is the pressure after 1 shock.
[b] $T_2$ is the temperature after 1 shock.
[c] $T_5$ is the temperature after the shock is reflected.

of the design and operation of the apparatus. In the light of the present specification, a person skilled in the art can select proper design and operation in order to obtain desired residence times and through-puts for a given instance. As an example, in an apparatus containing 35 tubes, each 6 inches long, and having cross-sectional areas of 0.25 square inch, the apparatus being rotated at 8000 r.p.m. to provide a residence time of 0.002 second, through-puts of 0.1 to 0.2 pound of gas per second, may typically be obtained.

The charge stock for the process according to the invention comprises carbonaceous, hydrogenous and sulfur containing material. Preferred charge stocks are mixtures of methane with hydrogen sulfide. Mixtures of carbonaceous material, wherein the latter is for example elemental carbon, a carbon oxide such as carbon monoxide etc., analiphatic hydrocarbon such as ethane, ethylene, acetylene, butane, or higher hydrocarbon, or a cyclic hydrocarbon such as benzene, cyclohexane, etc., or a substituted hydrocarbon such as halogenated hydrocarbon, e.g. ethyl chloride, etc., with sulfur containing material, wherein the latter is for example pure sulfur or an organic sulfide such as $C_1$ to $C_8$ alkyl or dialkyl sulfide. Oxygen and oxygen-containing compounds which decompose under the reaction conditions to give oxygen are not employed, since oxygen has an adverse effect on the yield of carbon disulfide.

Preferably, the driving gas, the reactants and the products are gas phase materials at the temperature of introduction into the reaction tubes. Where elemental carbon is employed as a reactant, it may be introduced into the tubes as a suspension in nitrogenous gas. Gas phase, as the term is used herein, includes vapor phase.

The reaction according to the invention proceeds satisfactorily without a catalyst. However, a known catalyst can be employed if desired, e.g. as a coating on the insides of the tubes. The tubes themselves should be free of obstruction, in order that the shock wave may be satisfactorily propagated.

The amount of carbonaceous material (as elemental carbon) in a mixture with sulfur containing material in the charge stock is preferably in the range from 30 to 60 mol percent based on the sum of elemental carbon and molecular sulfur in the mixture, where it is desired to obtain maximum yield of carbon disulfide. However, other proportions can be used in suitable instances, for example where it is desired to produce relatively greater amounts of sulfur in addition to carbon disulfide.

The yield of carbon disulfide obtained in the process according to the invention generally increases with the increasing temperature. The yield obtained at 1200° C. and higher, for example, is generally higher than that obtained at lower temperatures. The combination of very rapid heating to high temperatures with subsequent very rapid quenching of the reaction products gives superior yields of carbon disulfide which cannot be obtained with prior art processes which do not provide such rapid heating and cooling.

The invention claimed is:

1. Process for preparing carbon disulfide which comprises introducing hydrogen at an initial temperature in the range of from 125 to 425° C. and an initial pressure ($P_1$) in the range of from 5 to 50 atmospheres into an end of a tube containing a mixture of reactant gases comprising an aliphatic hydrocarbon and a sulfur-containing compound which does not decompose to give oxygen but which yields reactive sulfur under reaction conditions, said mixture being present at an initial temperature in the range of from 125 to 425° C. and an initial pressure ($P_4$) in the range of from 0.1 to 2.0 atmospheres and the ratio $P_1/P_4$ being at least 5.0, thereby to subject the said mixture to a shock wave, and reacting components of said mixture in the absence of oxygen at reaction temperatures in the range of 800 to 2,000° C. to produce carbon disulfide and removing and separating carbon disulfide as a product.

2. Process according to claim 1 wherein the tube is subjected to a plurality of reaction cycles in each of which said mixture of reactant gases is introduced into one end of the tube, then hydrogen is introduced into the same end of the tube, then the reaction products are withdrawn from the other end of the tube, and then hydrogen is withdrawn from the other end of the tube.

3. Process according to claim 1 wherein the tube is subjected to a plurality of reaction cycles in each of which the said mixture of reactant gases is introduced into one end of the tube, then hydrogen is introduced into the same end of the tube, then hydrogen is withdrawn from the same end of the tube, then a mixture of reaction products is withdrawn from the same end of the tube, the said mixture of reactant gases having been subjected first to a shock wave traveling away from that end of the tube and then to a returning shock wave traveling toward that end of the tube.

4. Process according to claim 1 wherein the aliphatic hydrocarbon compound is selected from the group consisting of methane, ethane, ethylene, acetylene, and butane.

5. Process according to claim 4 wherein the aliphatic hydrocarbon is methane.

6. Process according to claim 1 wherein the sulfur-containing compound is selected from the group consisting of hydrogen sulfide and an organic sulfide having an alkyl group containing from one to eight carbon atoms.

7. Process according to claim 6 wherein the sulfur-containing compound is hydrogen sulfide.

8. Process according to claim 1 wherein said ratio is at least 20 and said initial temperature of said mixture is at least 400° C., whereby a reaction temperature of at least 1500° C. is obtained.

9. Process according to claim 1 wherein said ratio is at least 10 and said initial temperature is at least 300° C.

10. Process according to claim 1 wherein the residence time of the reactant gas in the tube is in the range from 0.0005 to 1.0 second.

11. Process for preparing carbon disulfide which comprises introducing into a reaction tube a mixture of reactant gases comprising an aliphatic hydrocarbon and a sulfur-containing compoundd which does not decompose to give oxygen but which yields reactive sulfur under reaction conditions, subsequently introducing a gas selected from the group consisting of hydrogen and helium under pressure of 5 to 50 atmospheres into said tube, thereby to subject the reactant mixture to a shock wave and rapidly heat said mixture, reacting components of said mixture in the absence of oxygen to produce carbon disulfide, and subsequently withdrawing reaction products and said gas from said tube.

12. Process for preparing carbon disulfide which comprises introducing hydrogen at an initial temperature in the range of from 125 to 425° C. and an initial pressure ($P_1$) in the range of from 5 to 50 atmospheres into an end of a tube containing a mixture of reactant gases comprising an aliphatic hydrocarbon and elemental sulfur, said mixture being present at an initial temperature in the range of from 125 to 425° C. and an initial pressure ($P_4$) in the range of from 0.1 to 2.0 atmospheres and the ratio $P_1/P_4$ being at least 5.0, thereby to subject the said mixture to a shock wave, and reacting components of said mixture in the absence of oxygen at reaction temperature in the range of 800 to 2,000° C. to produce carbon disulfide and removing and separating carbon disulfide as a product.

13. Process for preparing carbon disulfide which comprises introducing into a reaction tube a mixture of reactant gases comprising an aliphatic hydrocarbon and elemental sulfur, subsequently introducing a gas selected from the group consisting of hydrogen and helium under pressure of 5 to 50 atmospheres into said tube, thereby to subject the reactant mixture to a shock wave and rapidly heat said mixture, reacting components of said mixture in the absence of oxygen to produce carbon disulfide, and subsequently withdrawing reaction products and said gas from said tube.

References Cited by the Examiner

UNITED STATES PATENTS

| | | | |
|---|---|---|---|
| 1,735,409 | 11/1929 | Pier et al. | 23—206 |
| 2,443,854 | 6/1948 | Ferguson | 23—206 |
| 2,777,813 | 1/1957 | Totzek | 204—154 |
| 2,832,666 | 4/1958 | Hertzberg et al. | 23—1 |
| 2,902,337 | 9/1959 | Glick et al. | 23—1 |

OTHER REFERENCES

Greene: Jour. American Chem. Soc., pages 2127 to 2131, April 20, 1954, vol. 76.

MAURICE A. BRINDISI, *Primary Examiner.*